US009234758B2

(12) United States Patent
Friend et al.

(10) Patent No.: US 9,234,758 B2
(45) Date of Patent: Jan. 12, 2016

(54) MACHINE POSITIONING SYSTEM UTILIZING POSITION ERROR CHECKING

(71) Applicant: Caterpillar Inc., Peoria, IL (US)

(72) Inventors: Paul Russell Friend, Morton, IL (US); Qi Chen, Dunlap, IL (US); Frank Arthur Willis, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 90 days.

(21) Appl. No.: 13/721,958

(22) Filed: Dec. 20, 2012

(65) Prior Publication Data

US 2014/0180579 A1 Jun. 26, 2014

(51) Int. Cl.
G01C 21/20 (2006.01)
G01C 21/16 (2006.01)
G01B 11/00 (2006.01)
G01S 17/02 (2006.01)
G01S 17/89 (2006.01)
E02F 9/26 (2006.01)

(52) U.S. Cl.
CPC ............. *G01C 21/165* (2013.01); *G01B 11/00* (2013.01); *G01S 17/023* (2013.01); *G01S 17/89* (2013.01); *E02F 9/264* (2013.01)

(58) Field of Classification Search
CPC .... G01C 21/28; G01C 21/165; G05D 1/0246; G01B 11/00; G01S 17/023; G01S 17/89; E02F 9/264
See application file for complete search history.

(56) References Cited

U.S. PATENT DOCUMENTS

| 5,390,124 | A | 2/1995 | Kyrtsos |
| 6,064,942 | A | 5/2000 | Johnson et al. |
| 6,445,983 | B1* | 9/2002 | Dickson et al. ................ 701/23 |
| 7,502,688 | B2 | 3/2009 | Hirokawa |
| 7,689,321 | B2 | 3/2010 | Karlsson |
| 7,711,476 | B2* | 5/2010 | Chiou et al. .................. 701/480 |
| 7,840,352 | B2* | 11/2010 | Strelow et al. ............... 701/469 |
| 8,180,514 | B2* | 5/2012 | Kaprielian et al. ............ 701/27 |
| 8,521,412 | B2* | 8/2013 | Miucic .......................... 701/300 |
| 8,666,661 | B2* | 3/2014 | Higgins ........................ 701/495 |
| 2007/0052950 | A1 | 3/2007 | Taylor et al. |
| 2008/0033645 | A1 | 2/2008 | Levinson et al. |
| 2008/0039991 | A1 | 2/2008 | May et al. |
| 2008/0119970 | A1 | 5/2008 | Campbell et al. |

* cited by examiner

*Primary Examiner* — John Q Nguyen
*Assistant Examiner* — Alan D Hutchinson
(74) *Attorney, Agent, or Firm* — Finnegan, Henderson, Farabow, Garrett & Dunner, LLP

(57) ABSTRACT

A system and method for estimating position of a machine is disclosed. The method may include receiving, from a perception sensor, scene data describing an environment in a vicinity of the machine and estimating a first position of the machine based on the scene data. The method may include determining whether a first signal indicative of a location of the machine is received by the machine and estimating a second position of the machine when it is determined that the first signal is received. The method may include comparing the second position with the first position and estimating a third position of the machine using at least one of the first position and the second position.

20 Claims, 4 Drawing Sheets

MACHINE POSITIONING SYSTEM UTILIZING POSITION ERROR CHECKING

TECHNICAL FIELD

The present disclosure relates generally to a machine positioning system and, more particularly, to a machine positioning system utilizing position error checking.

BACKGROUND

Machines such as, for example, dozers, motor graders, wheel loaders, wheel tractor scrapers, and other types of heavy equipment are used to perform a variety of tasks. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The position, velocity, distance traveled by the machine, etc. are parameters whose accuracy may be important for control of the machine and its operations.

Conventional machines typically utilize a navigation or positioning system to determine various operating parameters such as position, velocity, pitch rate, yaw rate, roll rate, etc. for the machine. Some conventional machines utilize a combination of one or more of Global Navigation Satellite System (GNSS) data, a Distance Measurement Indicator (DMI) or odometer measurement data, Inertial Measurement Unit (IMU) data, etc. to determine these parameters. Some machines utilize RADAR sensors, SONAR sensors, LIDAR sensors, IR and non-IR cameras, and other similar sensors to help guide the machines safely and efficiently along different kinds of terrain. Conventional machines have attempted to fuse these different types of data to determine the position of a land-based vehicle.

An exemplary system that may be utilized to determine the position of a machine is disclosed in U.S. Patent Application Publication No. 2008/0033645 ("the '645 publication") to Levinson et al. that published on Feb. 7, 2008. The system of the '645 publication utilizes location data from sensors such as Global Positioning System (GPS), as well as scene data from a LIDAR (light detection and ranging) device to determine a location or position of the machine. Specifically, the data is used to create a high-resolution map of the terrain and the position of the machine is localized with respect to the map.

Although the system of the '645 publication may be useful in determining the position of the machine, the system may not provide accurate estimates for the position of the machine while dead-reckoning (i.e., during periods of time when GPS signals are unavailable). Moreover, the system of the '645 publication may not provide accurate position information when GPS signals are unreliable or erroneous due to multi-path errors, position jumps, etc. because the system of the '645 publication does not check for the accuracy of the GPS signal.

The positioning system of the present disclosure is directed toward solving one or more of the problems set forth above and/or other problems of the prior art.

SUMMARY

In one aspect, the present disclosure is directed to a system for estimating position of a machine. The system may include a perception sensor configured to generate scene data describing an environment in a vicinity of the machine and a locating device configured to receive a first signal indicative of a location of the machine. The system may further include a controller in communication with the perception sensor and the locating device. The controller may be configured to estimate a first position of the machine based on the scene data and determine whether the first signal indicative of a location of the machine is received by the machine. The controller may be further configured to estimate a second position of the machine when it is determined that the first signal is received and compare the second position with the first position. The controller may be further configured to estimate a third position of the machine using at least one of the first position and the second position, wherein the controller may be configured to estimate the third position based on a result of the comparison between the second position and the first position.

In another aspect, the present disclosure is directed to a method of estimating position of a machine. The method may include receiving, from a perception sensor, scene data describing an environment in a vicinity of the machine and estimating a first position of the machine based on the scene data. The method may further include determining whether a first signal indicative of a location of the machine is received by the machine and estimating a second position of the machine when it is determined that the first signal is received. The method may further include comparing the second position with the first position and estimating a third position of the machine using at least one of the first position and the second position. Further, estimating the third position may be performed based on a result of the comparison between the second position and the first position.

In yet another aspect, the present disclosure is directed to a non-transitory computer-readable storage device storing instruction for enabling a processor to execute a method of estimating position of a machine. The method may include receiving, from a perception sensor, scene data describing an environment in a vicinity of the machine and estimating a first position of the machine based on the scene data. The method may further include determining whether a first signal indicative of a location of the machine is received by the machine and estimating a second position of the machine when it is determined that the first signal is received. The method may further include comparing the second position with the first position and estimating a third position of the machine using at least one of the first position and the second position. Further, estimating the third position may be performed based on a result of the comparison between the second position and the first position.

DETAILED DESCRIPTION

Figure 1:
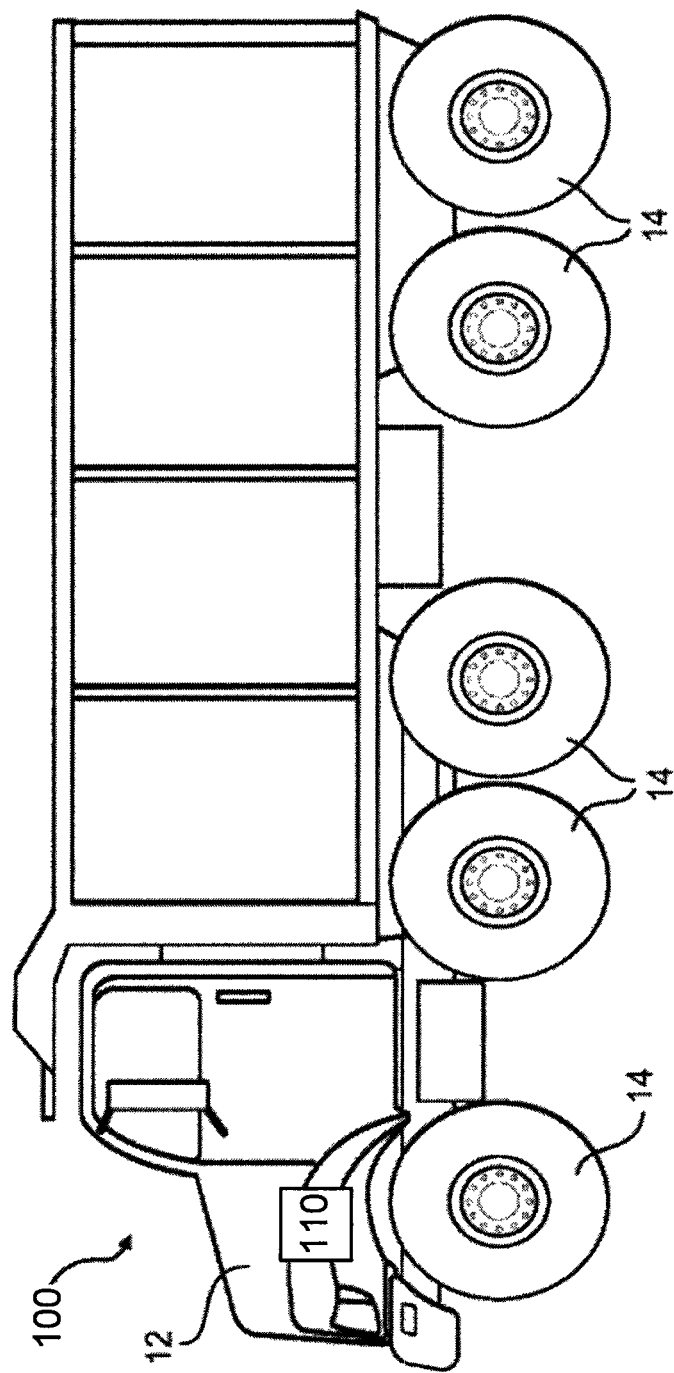
FIG. 1 is a pictorial illustration of an exemplary disclosed machine.

FIG. 1 illustrates a machine 100 having an exemplary disclosed positioning system 110. The machine 100 may be configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine. Machine 100 may generally include a frame 12 that at least partially defines or supports an operator station, one or more engines mounted to the frame, a plurality of traction devices 14 driven by the engine to propel machine 100. The traction devices 14, in the disclosed exemplary embodiments, are wheels located at opposing sides of machine 100. Each traction device 14 may be independently driven to turn machine 100 or simultaneously and dependently driven to propel machine 100 in a straight direction. It is contemplated that one or all of traction devices 14 may be replaced with another type of traction device, if desired, such as belts or tracks.

Figure 2:
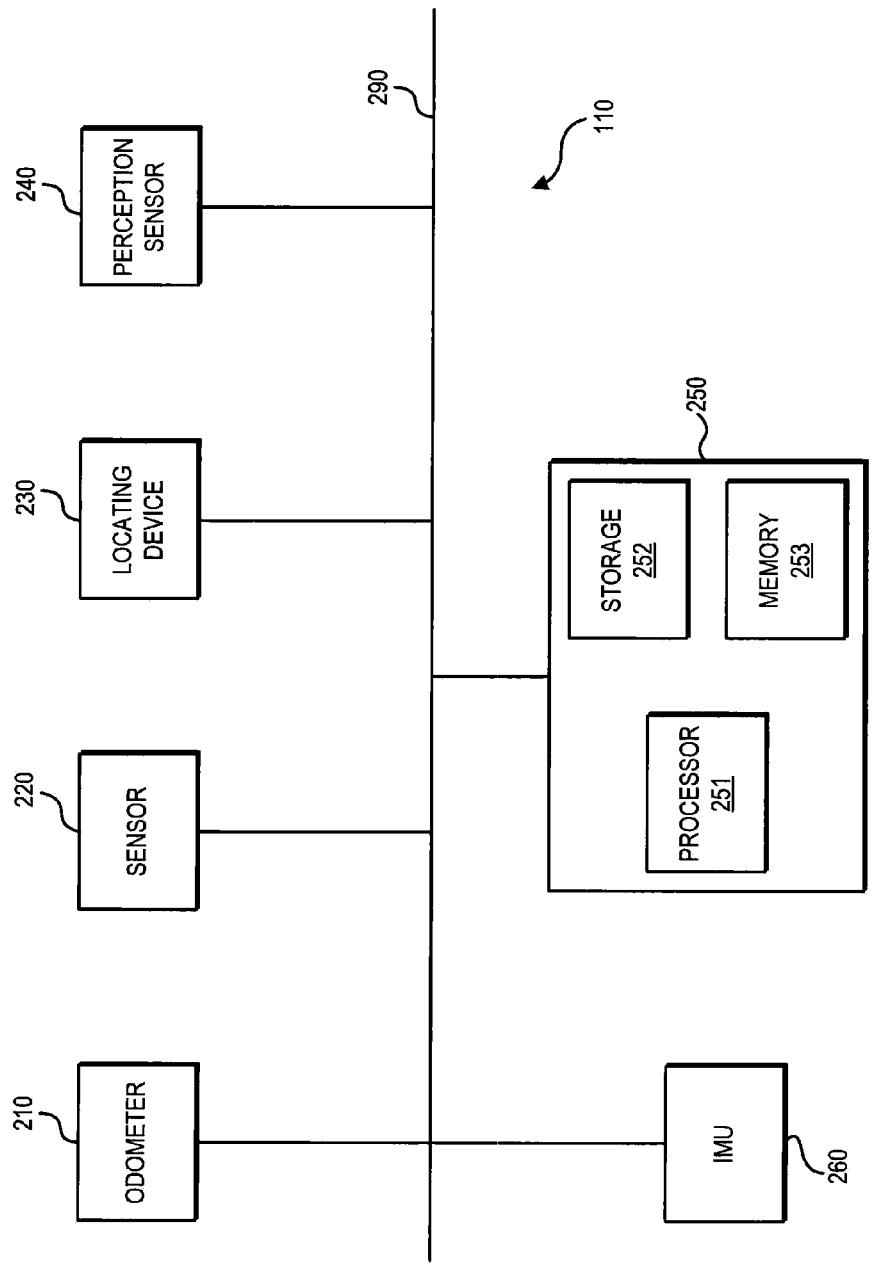
FIG. 2 is a diagrammatic illustration of an exemplary disclosed positioning system that may be used in conjunction with the machine of FIG. 1.

FIG. 2 illustrates an exemplary embodiment of the positioning system 110. The positioning system 110 may include an odometer 210, a sensor 220, a locating device 230, a perception sensor 240, a controller 250, and an inertial measurement unit (IMU) 260. The above sensors and the controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

The odometer 210 may provide a signal indicative of a distance traveled by the machine. The odometer 210 may provide as the signal, a measurement of number of rotations of the traction device 14 (such as a wheel 14). The odometer 210 may also provide, as the signal indicative of a distance traveled by the machine, a measurement of number of rotations of a member of the machine 100's drive train. For example, the odometer 210 may provide a measurement of number of rotations of an axle of the machine 100.

The sensor 220 may include any device capable of providing parametric values or machine parameters associated with performance of the machine 100. For example, the sensor 220 may include a payload sensor that provides a signal indicative of a payload of the machine 100. The sensor 220 may further include a slip detector that provides a signal indicative of a slip of the machine 100. The sensor 220 may further include devices capable of providing signals indicative of a slope of the ground on which the machine 100 is operating, an outside temperature, tire pressure if the traction device 14 is a wheel, etc. It will be understood that the sensor 220 may have one or more of the above-mentioned devices that provide the different parametric values or machine parameters such as payload, temperature, tire pressure, slip, slope, etc.

The locating device 230 may include any device capable of providing a signal that indicates the machine's location. For example, the locating device 230 could embody, a global satellite system device (e.g., a GPS or GNSS device) that receives or determines positional information associated with machine 100 and can provide an independent measurement of the machine's position. The locating device 230 may be configured to convey a signal indicative of the received or determined positional information to one or more of interface devices for display of machine location, if desired. The signal may also be directed to a controller 250 for further processing. In the exemplary embodiments discussed herein, the locating device 230 receives a GPS signal as the location signal indicative of the location of the machine 100 and provides the received location signal to the controller 250 for further processing. Additionally, the locating device 230 may also provide an uncertainty measure associated with the location signal. However, it will be understood by one of ordinary skill in the art that the disclosed exemplary embodiments could be modified to utilize other indicators of the location of the machine 100, if desired.

The perception sensor 240 may include any device that is capable of providing scene data describing an environment in the vicinity of the machine 100. Exemplarily, the perception sensor 240 may embody a device that detects and ranges objects located 360 degrees around the machine 100. For example, the perception sensor 240 may be embodied by a LIDAR device, a RADAR (radio detection and ranging) device, a SONAR (sound navigation and ranging) device, a camera device, or another device known in the art. In one example, the perception sensor 240 may include an emitter that emits a detection beam, and an associated receiver that receives a reflection of that detection beam. Based on characteristics of the reflected beam, a distance and a direction from an actual sensing location of the perception sensor 240 on machine 100 to a portion of a sensed physical object may be determined. By utilizing beams in a plurality of directions, the perception sensor 240 may generate a picture of the surroundings of the machine 100. For example, if the perception sensor 240 is embodied by a LIDAR device or another device using multiple laser beams, the perception sensor 240 may generate a cloud of points as the scene data describing an environment in the vicinity of the machine 100. It will be noted that the scene data may be limited to the front side (180 degrees or less) of the machine 100 in some embodiments. In other embodiments, the perception sensor 240 may generate scene data for objects located 360 degrees around the machine 100.

The IMU 260 may include devices that provide angular rates and acceleration of the machine 100. For example, the IMU 260 may include a 6-degree of freedom (6 DOF) IMU. A 6 DOF IMU consists of a 3-axis accelerometer, 3-axis angular rate gyros, and sometimes a 2-axis inclinometer. The 3-axis angular rate gyros may provide signals indicative of the pitch rate, yaw rate, and roll rate of the machine 100. The 3-axis accelerometer may provide signals indicative of the acceleration of the machine 100 in the x, y, and z directions.

The controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AIVID™, any of various processors manufactured by Sun Microsystems, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more position estimation programs or subprograms loaded from storage 252 or elsewhere that, when executed by processor 251, perform various procedures, operations, or processes consistent with the disclosed embodiments. For example, memory 253 may include one or more programs that enable controller 250 to, among other things, collect data from the odometer 210, the sensor 220, the locating device 230, the perception sensor 240, the IMU 260, and process the data according to disclosed embodiments such as those embodiments discussed with regard to FIGS. 3 and 4, and estimate the position of the machine 100 based on the processed data.

In certain exemplary embodiments, the position estimation programs may enable the controller 250 (more particularly enable the processor 251) to process the received signals using a Kalman filter and a Perception Based Localization (PBL) filter to estimate the position of the machine 100. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance or the uncertainty), and a current measurement value to produce a refined a posteriori estimate.

Figure 3:
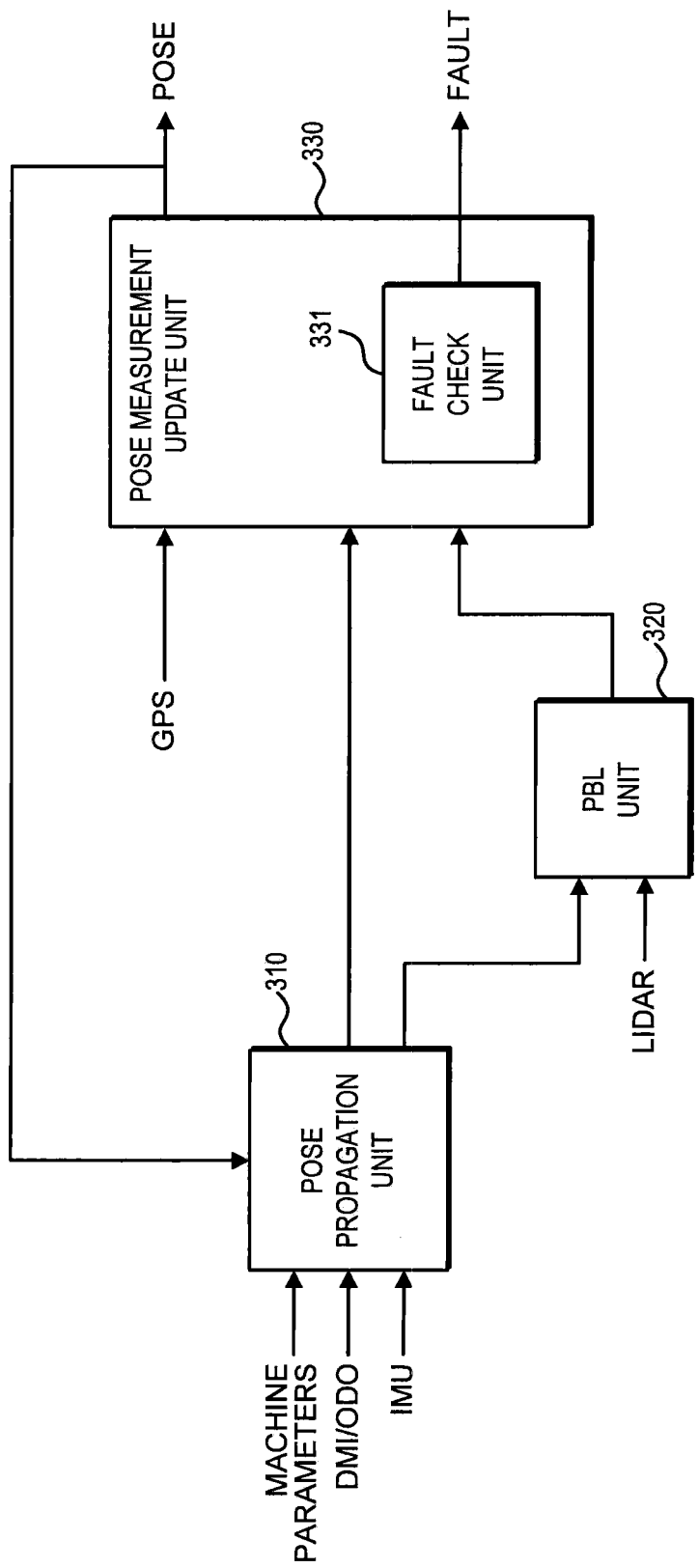
FIG. 3 is a diagrammatic illustration of an exemplary processor in the disclosed positioning system of FIG. 2.

FIG. 3 illustrates an exemplary embodiment of the controller 250, and more particularly of the processor 251. The controller 250 may include a pose propagation unit 310, a PBL unit 320, a pose measurement update unit 330, and a fault check unit 331 provided in the pose measurement update unit 330. The pose propagation unit 310 and pose measurement update unit 330 may implement the propagation (or "predict") phase and the measurement update (or "update") phase, respectively, of a Kalman filter. The PBL unit 320 may implement a separate PBL filter. Although the components included in the controller 250 are shown as separate components, they may be implemented in any combination of hardware and/or software. For example, in one embodiment, the components in the controller 250 shown in FIG. 3 may be implemented in the form of software stored on one or more of the storage 252 and/or the memory 253 that, when executed by the processor 251, enable the controller 250 to perform functions related to disclosed embodiments.

The pose propagation unit 310 may receive signals from the odometer 210, sensor 220, and IMU 260. By utilizing these signals, the pose propagation unit 310 may propagate or "predict" certain states of the machine 100. For example, the pose propagation unit 310 may predict the following states: position, forward velocity, angular velocities, and angular orientation (attitude) of the machine 100. The pose propagation unit 310 may receive, from the odometer 210, a signal indicative of the distance traveled by the machine 100. The distance signal may be a measurement of number of rotations of a traction device 14 (for example, wheel 14). The pose propagation unit 310 may also receive a scale factor, which when multiplied by the number of rotations of traction device 14, provides the distance traveled by the machine 100 in a given time period. The pose propagation unit 310 may calculate, the distance traveled by the machine 100 by multiplying the received scale factor with the number of rotations of traction device 14. Further, the pose propagation unit 310 may estimate a forward velocity of the machine 100 by dividing the calculated distance by a time period corresponding to the calculated distance. In another exemplary embodiment, the pose propagation unit 310 may calculate forward velocity of the machine 100 by integrating a signal indicative of forward acceleration from the IMU 260. In another exemplary embodiment, the 310 may calculate forward velocity using signals from both the odometer 210 and the IMU 260 and combine the resulting velocities to generate a predicted forward velocity. Further, the predicted forward velocity and/or the distance traveled by the machine 100 may be adjusted based on the machine parameters from the sensor 220. For example, the distance traveled may be adjusted to account for slipping of the machine 100.

The pose propagation unit 310 may also receive signals indicative of the angular rates (roll rate, yaw rate, and pitch rate) of the machine 100 from the IMU 260. By integrating the angular rates, the pose propagation unit 310 may determine the attitude or angular orientation (roll, heading, and pitch) of the machine 100. By utilizing the angular rates and the forward velocity, the pose propagation unit 310 may predict a position of the machine 100. The pose propagation unit 310 may also calculate an uncertainty for the predicted position which may be set equal to the uncertainty from an error covariance matrix of the Kalman filter.

The PBL unit 320 may determine an independent position estimate for the machine 100 by utilizing the scene data from the perception sensor 240 and the forward velocity and angular rates from the pose propagation unit 310. Exemplarily, the PBL unit 320 may store a map of the work site where the machine 100 is operating. By utilizing the forward velocity propagated by the pose propagation unit 310 and angular rates from the IMU 260, the PBL unit 320 may estimate a current position of the machine 100. For example, the PBL unit 320 may propagate a past position estimate based on the forward velocity and angular rates to determine an estimated position of the machine 100. Based on the estimated position, the PBL unit 320 may generate multiple particles that correspond to different hypothesized position or location of the machine 100 in the work site. Each of the particles may correspond to a particular position or location in the site and may include a scene of the site as viewed from that position. The PBL unit 320 may then utilize the scene data from the perception sensor 240 to chose one or more particles that best match the scene data from the perception sensor 240. The PBL unit 320 may then weight the positions associated with the chosen particles to determine a PBL position estimate, which is a position estimate independent from the position estimate output by the pose propagation unit 310. In the above description, the PBL unit 320 was described as implementing a particle filter. However, in other embodiments, the PBL unit 320 may use a Kalman filter to determine the PBL position estimate. It will be noted that the PBL position estimate may include an estimated position of the machine 100 and an uncertainty associated with the estimated position. For example, the PBL position estimate may indicate that the machine 100 is located at certain coordinates (say "Y") within the work site with an uncertainty of "X" meters. This could indicate to the controller 250 that the machine 100 is located within X meters of coordinate Y.

The pose measurement update unit 330 may implement the measurement update (or "update") phase of the Kalman filter. In the measurement update phase, an updated position estimate is determined for the machine 100 by utilizing the propagated position estimate output by the pose propagation unit 310 and an independent position measurement. The independent position estimate may be determined by utilizing at least one of the location signal from the locating device 230 and the PBL position estimate from the PBL unit 320. Initially, the pose measurement update unit 330 may determine whether a location signal is received by the machine 100. For example, if the location signal is a GPS signal, the pose measurement update unit 330 may determine whether GPS signals are received by the locating device 230. If the location signal is not received, the pose measurement update unit 330 may utilize the PBL position estimate as the independent position measurement. However, if the location signal is received by the locating device 230, the pose measurement update unit 330 may determine whether the received location signal from the locating device 230 is reliable or valid.

Exemplarily, the fault check unit 331 in the pose measurement update unit 330 may determine whether the received location signal from the locating device 230 is reliable or valid. The fault check unit 331 may make this determination by comparing the location or position indicated by the location signal (for example, a GPS signal) with the position indicated by the PBL position estimate. If the position indicated by the location signal is within a predetermined tolerance of the position indicated by the PBL position estimate, the fault check unit 331 may determine that the location signal is valid. Exemplarily, the tolerance may be set to a predetermined value such as 1 meter, 10 cm, 1 cm, etc. depending on the machine operator's preference.

If the location signal is determined to be valid, the pose measurement update unit 330 may determine an independent position measurement using at least one of the location signal and the PBL position estimate. In one exemplary embodiment, the pose measurement update unit 330 may utilize as the independent position measurement, either the position indicated by the location signal or the position indicated by the PBL position estimate, depending on the uncertainty associated with the location signal and the PBL position. For example, if the uncertainty associated with the location signal is 1 meter whereas the uncertainty associated with the PBL position estimate is 1 cm, the pose measurement update unit 330 may utilize the position indicated by the PBL position estimate as the independent position measurement. Similarly, if the PBL position uncertainty is higher than the location signal uncertainty, the position indicated by the location signal may be utilized as the independent position measurement. In another exemplary embodiment, the PBL position and the position indicated by the location signal may be combined based on their respective uncertainties to generate the independent position measurement. For example, the two position indications may be added by weighting them based on their respective uncertainties.

Having determined the independent position measurement, the pose measurement update unit 330 may determine an updated position estimate based on the propagated position estimate output by the pose propagation unit 310 and the independent position measurement. Exemplarily, generic Kalman filter measurement update equations may be utilized to determine the updated position estimate. Exemplarily, the pose measurement update unit 330 may output the updated position estimate as the pose of the machine 100. The pose measurement update unit 330 may also determine updated velocity and distance traveled by the machine 100 and include these parameters in the pose of the machine 100 which may be fed back to the pose propagation unit 310. The pose propagation unit 310 may propagate the pose in the next cycle of calculations.

Having determined an updated position estimate for the machine 100, the pose measurement update unit 330 may determine the scale factor for the odometer 210 and the biases for the IMU 260. For example, the pose measurement update unit 330 may compare the position output from the pose propagation unit 310 and the position output from the pose measurement update unit 330 to adjust the scale factor to bring the "predict" phase position closer to the "update" phase position. The adjusted scale factor may be utilized by the pose propagation unit 310 in the next iteration of the "predict" phase. Similarly, the pose measurement update unit 330 may also calculate the biases for the IMU 260.

Additionally, the fault check unit 331 may check the updated position estimate against the PBL position estimate to determine whether the overall system is functioning as intended and whether there are any major issues with the position estimation. For example, if the updated position estimate is not within a predetermined range or tolerance of the PBL position estimate, the fault check unit 331 may declare a fault with the overall position estimation. However, in an exemplary embodiment, the fault check unit 331 may first determine whether the uncertainty associated with the PBL position estimate is within some predetermined range or tolerance and if the uncertainty of the PBL position estimate is outside the predetermined range, the fault check unit 331 may skip comparing the PBL position estimate with the updated position estimate.

Figure 4:
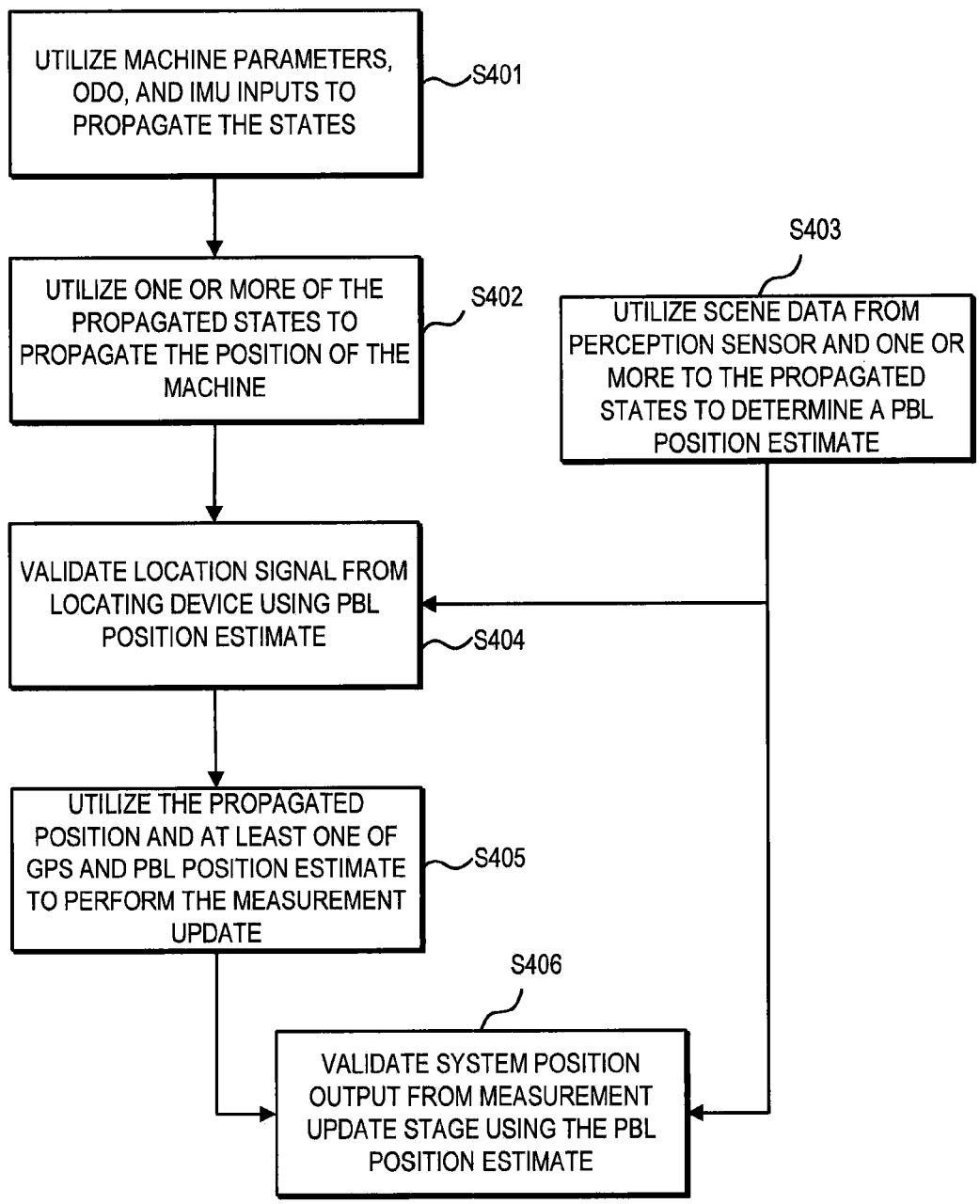
FIG. 4 is a flowchart depicting an exemplary disclosed method performed by the disclosed exemplary processor of FIG. 3.

FIG. 4 is an exemplary process implemented by the controller 250 to estimate the position of the machine 100. A detailed description of FIG. 4 is provided in the next section.

INDUSTRIAL APPLICABILITY

The disclosed positioning system 110 may be applicable to any machine where accurate detection of the machine's position is desired. The disclosed positioning system may provide for improved estimation of the machine's position by utilizing an independent position estimate from a perception sensor to check the accuracy of the location signal such as a GPS signal prior to utilizing the location signal to estimate the position of the machine. Operation of the positioning system 110 will now be described in connection with the flowchart of FIG. 4.

In step 401, the pose propagation unit 310 may utilize machine parameters, odometer signals, and IMU inputs to propagate or "predict" the states. For example, the pose propagation unit 310 may predict the following states: position, forward velocity, angular velocities, and angular orientation (attitude) of the machine 100. As discussed above, the pose propagation unit 310 may receive, from the odometer 210, a signal indicative of the distance traveled by the machine 100. The pose propagation unit 310 may calculate, the distance traveled by the machine 100 by multiplying the received scale factor with the number of rotations of traction device 14 included in the signal received from the odometer 210. Further, the pose propagation unit 310 may estimate a forward velocity of the machine 100 by dividing the calculated distance by a time period corresponding to the calculated distance. In another exemplary embodiment, the pose propagation unit 310 may calculate forward velocity of the machine 100 by integrating a signal indicative of forward acceleration from the IMU 260. In another exemplary embodiment, the pose propagation unit 310 may calculate forward velocity using signals from both the odometer 210 and the IMU 260 and weight the resulting velocities to generate a predicted forward velocity. Further, the predicted forward velocity and/or the distance traveled by the machine 100 may be adjusted based on the machine parameters from the sensor 220. For example, the distance traveled may be adjusted to account for slipping of the machine 100. The pose propagation unit 310 may also receive signals indicative of the angular rates (roll rate, yaw rate, and pitch rate) of the machine 100 from the IMU 260. By integrating the angular rates, the pose propagation unit 310 may determine the attitude or angular orientation (roll, heading, and pitch) of the machine 100.

In step 402, the pose propagation unit 310 may utilize one or more of the propagated states to propagate or "predict" the position of the machine 100. For example, by utilizing the angular rates and the predicted forward velocity, the pose propagation unit 310 may predict a position of the machine 100. The pose propagation unit 310 may also calculate an uncertainty for the predicted position which may be set equal to the uncertainty from an error covariance matrix of the Kalman filter.

In step 403, the PBL unit 320 may receive scene data from the perception sensor 240 and one or more of the propagated states from the pose propagation unit 310. By utilizing the received data, the PBL unit 320 may determine a PBL position estimate. As discussed above, the PBL unit 320 may store a map of the work site where the machine 100 is operating and utilize a particle filter to determine the PBL position estimate. As stated earlier, the PBL position estimate may include an estimated position of the machine 100 and an uncertainty associated with the estimated position. For example, the PBL position estimate may indicate that the machine 100 is located at certain coordinates (say "Y") within the work site with an uncertainty of "X" meters. This could indicate to the controller 250 that the machine 100 is located within X meters of coordinate Y. In certain embodiments, the PBL unit 320 may use a Kalman filter to determine the PBL position estimate instead of the particle filter.

In step 404, the pose measurement update unit 330 may validate the location signal received by the locating device using the PBL position estimate. Initially, the pose measurement update unit 330 may determine whether a location signal is received by the machine 100. For example, if the location signal is a GPS signal, the pose measurement update unit 330 may determine whether GPS signals are received by the locating device 230. If the location signal is not received, the pose measurement update unit 330 may skip step 404. However, if the location signal is received by the locating device 230, the pose measurement update unit 330 may determine whether the received location signal by the locating device 230 is reliable or valid. Exemplarily, the fault check unit 331 in the pose measurement update unit 330 may determine whether the received location signal from the locating device 230 is reliable or valid. The fault check unit 331 may make this determination by comparing the location or position indicated by the location signal (for example, a GPS signal) with the position indicated in the PBL position estimate. If the position indicated by the location signal is within a predetermined tolerance of the position indicated by the PBL position estimate, the fault check unit 331 may determine that the location signal is valid. Exemplarily, the tolerance may be set to a predetermined value such as 1 meter, 10 cm, 1 cm, etc. depending on the machine operator's preference.

If the location signal is determined to be valid, the pose measurement update unit 330 may proceed to step 405. In step 405, the pose measurement update unit 330 may utilize the propagated position estimate output by the pose propagation unit 310 and an independent position measurement to implement the measurement update phase of the Kalman filter. The pose measurement update unit 330 may utilize, as the independent position measurement, at least one of the location signal and the PBL position estimate. In one exemplary embodiment, the pose measurement update unit 330 may utilize as the independent position measurement, either the position indicated by the location signal or the position indicated by the PBL position estimate, depending on the uncertainty associated with the location signal and the PBL position. In another exemplary embodiment, the PBL position and the position indicated by the location signal may be combined based on their respective uncertainties to generate the independent position measurement. For example, the two position indications may be added by weighting them based on their respective uncertainties.

Having determined the independent position measurement, the pose measurement update unit 330 may determine an updated position estimate based on the propagated position estimate output by the pose propagation unit 310 and the independent position measurement. Exemplarily, generic Kalman filter measurement update equations may be utilized to determine the updated position estimate. Exemplarily, the pose measurement update unit 330 may output the updated position estimate as the pose of the machine 100. The pose measurement update unit 330 may also determine updated velocity and distance traveled by the machine 100 and include these parameters in the pose of the machine 100 which may be fed back to the pose propagation unit 310. The pose propagation unit 310 may propagate the pose in the next cycle of calculations.

Having determined an updated position estimate for the machine 100, the pose measurement update unit 330 may determine the scale factor for the odometer 210 and the biases for the IMU 260. For example, the pose measurement update unit 330 may compare the position output from the pose propagation unit 310 and the position output from the pose measurement update unit 330 to adjust the scale factor to bring the "predict" phase position closer to the "update" phase position. The adjusted scale factor may be utilized by the pose propagation unit 310 in the next iteration of the "predict" phase. Similarly, the pose measurement update unit 330 may also calculate the biases for the IMU 260.

In step 406, the pose measurement update unit 330 may validate the updated position estimate against the PBL position estimate to determine whether the overall system is functioning as intended and whether there are any major issues with the position estimation. For example, if the updated position estimate is not within a predetermined range or tolerance of the PBL position estimate, the fault check unit 331 may declare a fault with the overall position estimation. However, in an exemplary embodiment, the fault check unit 331 may first determine whether the uncertainty associated with the PBL position estimate is within some predetermined range or tolerance and if the uncertainty of the PBL position estimate is outside the predetermined range, the fault check unit 331 may skip step 406. The process may continue to repeat in this manner until receiving instructions to stop or until new data ceases to be collected from the machine 100.

The disclosed exemplary embodiments may allow for accurate estimation of the position of the machine 100. For example, by checking the accuracy of the location signal such as a GPS signal prior to utilizing the location signal to estimate the position of the machine, an accurate estimation of the position of the machine 100 may be possible.

It will be apparent to those skilled in the art that various modifications and variations can be made to the disclosed positioning system. Other embodiments will be apparent to those skilled in the art from consideration of the specification and practice of the disclosed positioning system. It is intended that the specification and examples be considered as exemplary only, with a true scope being indicated by the following claims and their equivalents.

What is claimed is:

1. A method of estimating position of a machine, comprising:
   receiving, from a perception sensor, scene data describing an environment in a vicinity of the machine;
   estimating, by a controller of the machine, a first position of the machine based on the received scene data and a map of the environment of the machine;
   determining, by the controller of the machine, whether a global positioning system (GPS) signal indicative of a location of the machine is received by the machine;
   estimating, by the controller of the machine, a second position of the machine using the GPS signal when it is determined that the GPS signal is received;
   comparing, by the controller of the machine, the second position and the first position; and
   estimating, by the controller of the machine, a third position of the machine using at least one of the first position and the second position,
   wherein:
   estimating the third position is performed based on a result of the comparison between the second position and the first position.

2. The method of claim 1, wherein the scene data is generated by the perception sensor by scanning for physical objects in the vicinity of the machine.

3. The method of claim 1, further comprising estimating a fourth position of the machine, wherein:
   the fourth position is estimated in a propagation stage of a Kalman filter;
   the third position is estimated in a measurement update stage of the Kalman filter; and
   the third position is estimated based on the fourth position and at least one of the first position and the second position.

4. The method of claim 1, wherein the third position is estimated using a combination of the first position and the second position when an uncertainty of the second position in comparison to an uncertainty of the first position is within a predetermined range.

5. The method of claim 1, wherein the third position is estimated using one of the first position and the second position based on uncertainties associated with the first position and the second position.

6. The method of claim 1, further comprising:
   comparing the third position and the first position; and
   declaring a fault with respect to the third position if the third position is not within a predetermined range of the first position.

7. The method of claim 1, wherein estimating the first position includes:
   estimating a current position of the machine on the map,
   determining a plurality of particles based on the estimated current position on the map, each of the particles describing a scene of the environment of the machine as viewed from the estimated current position,
   selecting one or more of the plurality of particles based on a comparison of the received scene data with the plurality of particles, and
   estimating the first position of the machine based on the selected one or more particles.

8. A system for estimating position of a machine, comprising:
   a perception sensor configured to generate scene data describing an environment in a vicinity of the machine;
   a locating device configured to receive a global positioning system (GPS) signal indicative of a location of the machine; and
   a controller in communication with the perception sensor and the locating device, the controller configured to:
   estimate a first position of the machine based on the scene data and a map of the environment of the machine;
   determine whether the GPS signal is received by the machine;
   estimate a second position of the machine using the GPS signal when it is determined that the GPS signal is received;
   compare the second position with the first position; and
   estimate a third position of the machine using at least one of the first position and the second position,
   wherein:
   the controller is configured to estimate the third position based on a result of the comparison between the second position and the first position.

9. The system of claim 8, wherein the perception sensor is configured to generate the scene data by scanning for physical objects in the vicinity of the machine.

10. The system of claim 8, wherein the controller is further configured to estimate a fourth position of the machine, wherein:
    the fourth position is estimated in a propagation stage of a Kalman filter;
    the third position is estimated in a measurement update stage of the Kalman filter; and
    the third position is estimated based on the fourth position and at least one of the first position and the second position.

11. The system of claim 8, wherein the controller is configured to estimate the third position using a combination of the first position and the second position when an uncertainty of the second position in comparison to an uncertainty of the first position is within a predetermined range.

12. The system of claim 8, wherein the controller is configured to estimate the third position using one of the first position and the second position based on uncertainties associated with the first position and the second position.

13. The system of claim 8, wherein the controller is further configured to:
    compare the third position and the first position; and
    declare a fault with respect to the third position if the third position is not within a predetermined range of the first position.

14. The system of claim 8, wherein the controller is configured to estimate the first position by:
    estimating a current position of the machine on the map,
    determining a plurality of particles based on the estimated current position on the map, each of the particles describing a scene of the environment of the machine as viewed from the estimated current position,
    selecting one or more of the plurality of particles based on a comparison of the received scene data with the plurality of particles, and
    estimating the first position of the machine based on the selected one or more particles.

15. A non-transitory computer-readable storage medium storing instructions for enabling a processor to execute a method of estimating position of a machine, the method comprising:
    receiving, from a perception sensor, scene data describing an environment in a vicinity of the machine;

estimating, by a controller of the machine, a first position of the machine based on the scene data and a map of the environment of the machine;

determining, by the controller, whether a first signal indicative of a location of the machine is received by the machine;

estimating, by the controller, a second position of the machine using the first signal when it is determined that the first signal is received;

comparing, by the controller, the second position with the first position; and estimating, by the controller, a third position of the machine using at least one of the first position and the second position, wherein:

estimating the third position is performed based on a result of the comparison between the second position and the first position.

16. The non-transitory computer-readable storage medium of claim 15, wherein the scene data is generated by the perception sensor by scanning for physical objects in the vicinity of the machine.

17. The non-transitory computer-readable storage medium of claim 15, wherein:

the method further comprises estimating a fourth position of the machine;

the fourth position is estimated in a propagation stage of a Kalman filter;

the third position is estimated in a measurement update stage of the Kalman filter; and the third position is estimated based on the fourth position and at least one of the first position and the second position.

18. The non-transitory computer-readable storage medium of claim 15, wherein the third position is estimated using a combination of the first position and the second position when an uncertainty of the second position in comparison to an uncertainty of the first position is within a predetermined range.

19. The non-transitory computer-readable storage medium of claim 15, wherein the method further comprises:

comparing the third position and the first position; and declaring a fault with respect to the third position if the third position is not within a predetermined range of the first position.

20. The non-transitory computer-readable storage medium of claim 15, wherein estimating the first position includes:

estimating a current position of the machine on the map, determining a plurality of particles based on the estimated current position on the map, each of the particles describing a scene of the environment of the machine as viewed from the estimated current position, selecting one or more of the plurality of particles based on a comparison of the received scene data with the plurality of particles, and estimating the first position of the machine based on the selected one or more particles.

* * * * *